(12) United States Patent
Pell

(10) Patent No.: US 12,012,850 B1
(45) Date of Patent: Jun. 18, 2024

(54) COMMUNICATIONS MODULE FOR SURVEY TOOL

(71) Applicant: IMDEX TECHNOLOGIES PTY LTD, Balcatta (AU)

(72) Inventor: Christopher Pell, San Luis Obispo, CA (US)

(73) Assignee: IMDEX TECHNOLOGIES PTY LTD, Balcatta (AU)

( * ) Notice: Subject to any disclaimer, the term of this patent is extended or adjusted under 35 U.S.C. 154(b) by 0 days.

(21) Appl. No.: 18/058,798

(22) Filed: Nov. 25, 2022

(30) Foreign Application Priority Data

Nov. 24, 2022 (AU) .................. 2022275476

(51) Int. Cl.
*E21B 47/13* (2012.01)
*G01V 3/30* (2006.01)

(52) U.S. Cl.
CPC ............... *E21B 47/13* (2020.05); *G01V 3/30* (2013.01)

(58) Field of Classification Search
CPC ............ E21B 47/12; E21B 47/13; G01V 3/30
See application file for complete search history.

(56) References Cited

U.S. PATENT DOCUMENTS

| | | | |
|---|---|---|---|
| 5,944,124 A | 8/1999 | Pomerleau et al. | |
| 6,644,421 B1* | 11/2003 | Long | E21B 47/13 175/320 |
| 7,095,617 B1* | 8/2006 | Ni | H05K 5/0278 361/752 |
| 7,140,453 B2* | 11/2006 | Ayling | E21B 19/20 175/85 |
| 8,971,720 B2* | 3/2015 | Saint Georges | H04B 10/27 398/128 |
| 9,097,100 B2* | 8/2015 | Finke | E21B 47/01 |
| 9,666,005 B2* | 5/2017 | Ellis | G07C 9/00309 |
| 9,976,414 B2* | 5/2018 | Switzer | E21B 47/13 |
| 11,263,845 B2* | 3/2022 | Wilson | H04M 1/72412 |
| 11,279,324 B2* | 3/2022 | Gilbertson | G02B 27/0006 |
| 11,484,107 B2* | 11/2022 | Hurter | H02J 7/0047 |
| 2017/0089194 A1* | 3/2017 | Donderici | E21B 47/13 |
| 2022/0037760 A1* | 2/2022 | Schäuble | H01Q 13/10 |

OTHER PUBLICATIONS

TwinGyro Ultra-Rugged Dual Gyro Technology Datasheet; Inertial Sensing; 2018.

* cited by examiner

*Primary Examiner* — Franklin D Balseca
(74) *Attorney, Agent, or Firm* — Studebaker & Brackett PC

(57) ABSTRACT

A communication module for a survey tool assembly comprising: an outer housing, an inner body within the outer housing, an RF transceiver in the inner body, at least one coupling for coupling the communication module to a survey tool assembly, wherein the inner body comprises two or more apertures circumferentially arranged about the inner body, each aperture having: a) a length that allows propagation of RF signals to/from the RF transceiver, and b) a width such that the body has structural integrity to withstand: torsional forces due to rotation of a survey tool assembly and/or axial forces due to forces along the survey tool assembly.

23 Claims, 5 Drawing Sheets

COMMUNICATIONS MODULE FOR SURVEY TOOL

FIELD OF THE INVENTION

The present embodiments relate to communication modules for survey tools.

BACKGROUND TO THE INVENTION

In mineral mining, survey holes are drilled in a bench, which are then surveyed to gain an indication of the nature of the substrate.

Surveying holes can be time consuming and cumbersome. As with all mining, efficient and safe work processes are important. More efficiency with better health and safety reduces costs and provides a safer environment for workers. So any gains in efficiency along with improvements to health and safety can be advantageous.

SUMMARY OF INVENTION

It is an object of the present invention to provide an improved survey tool assembly and/or communications module for such a survey tool assembly.

In one aspect the present invention may be said to comprise a communication module for a survey tool assembly comprising: an outer housing, an inner body within the outer housing, an RF transceiver in the inner body, at least one coupling for coupling the communication module to a survey tool assembly, wherein the inner body comprises two or more apertures circumferentially arranged about the inner body, each aperture having: a) a length that allows propagation of RF signals to/from the RF transceiver, and b) a width such that the body has structural integrity to withstand: torsional forces due to rotation of a survey tool assembly and/or axial forces due to forces along the survey tool assembly.

Optionally structure width between the apertures provides the structural integrity.

Optionally the inner housing comprises steel, stainless steel or metal alloy

Optionally the length of the aperture allows propagation of RF signals so that RF requirements are met.

Optionally the RF requirement is that the RF transceiver can transmit/receive at a distance of up to about 30 metres, or up to about 20 metres or up to about 18 metres, or up to about 10 metres or up to about 5 metres or up to about 1 metre.

Optionally the length that allows propagation of RF signals to/from the RF transceiver is based on the transceiving frequency.

Optionally the length of the aperture is substantially ¼ wavelength or greater of the transceiving frequency.

Optionally the width of the aperture is about 30 mm or 20 mm, or about 15 mm or about 10 mm.

Optionally there are 1, 2, 3, 4, 5 or 6 windows

Optionally the RF transceiver transceives at 2.4 GHz or 4.8 GHz or 5 GHz, Optionally the outer housing comprises an RF permeable material.

Optionally the outer housing has structural integrity to withstand:
  a) axial forces due to forces along the survey tool assembly, and/or
  b) pressure forces from the borehole.

Optionally the outer housing provides a pressure rated communication module.

Optionally the module further comprises one or more tool coupling features.

Optionally the module further comprises one or more caps for the tool coupling features Optionally the module further comprises one or more pressure seals between the inner body and outer housing.

Optionally the RF transceiver can transceive omnidirectionally.

Optionally the module has a length of up about 20 cm, and preferably up to about 10 cm.

Optionally the inner body has an internal recess to receive edges of the PCB.

Optionally the RF transceiver has an operating light that can be seen through the aperture and outer body.

In another aspect the present invention may be said to comprise a communication module for a survey tool assembly comprising: an outer housing, an inner body within the outer housing, an RF transceiver in the inner body, at least one coupling for coupling the communication module to a survey tool assembly, wherein the inner body comprises two or more apertures circumferentially arranged about the inner body, each aperture having: a) a length that allows RF communications to meet RF requirements, and/or b) a width such that the body has structural integrity to meet structural requirements; and/or c) a width and/or spacing that allows RF communications to meet RF requirements, and/or d) a length to meet size requirements.

Optionally the outer housing:
  a) provides a pressure rated communication module, and/or
  b) is made from an RF permeable material to meet RF requirements, and/or
  c) meets structural requirements.

In another aspect the present invention may be said to comprise a survey tool assembly comprising a communication module according to any preceding statement.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The term "comprising" as used in this specification means "consisting at least in part of". Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF DRAWINGS

Embodiments will be described with reference to the following drawings, of which.

DETAILED DESCRIPTION

1. General Embodiment

Figure 1:
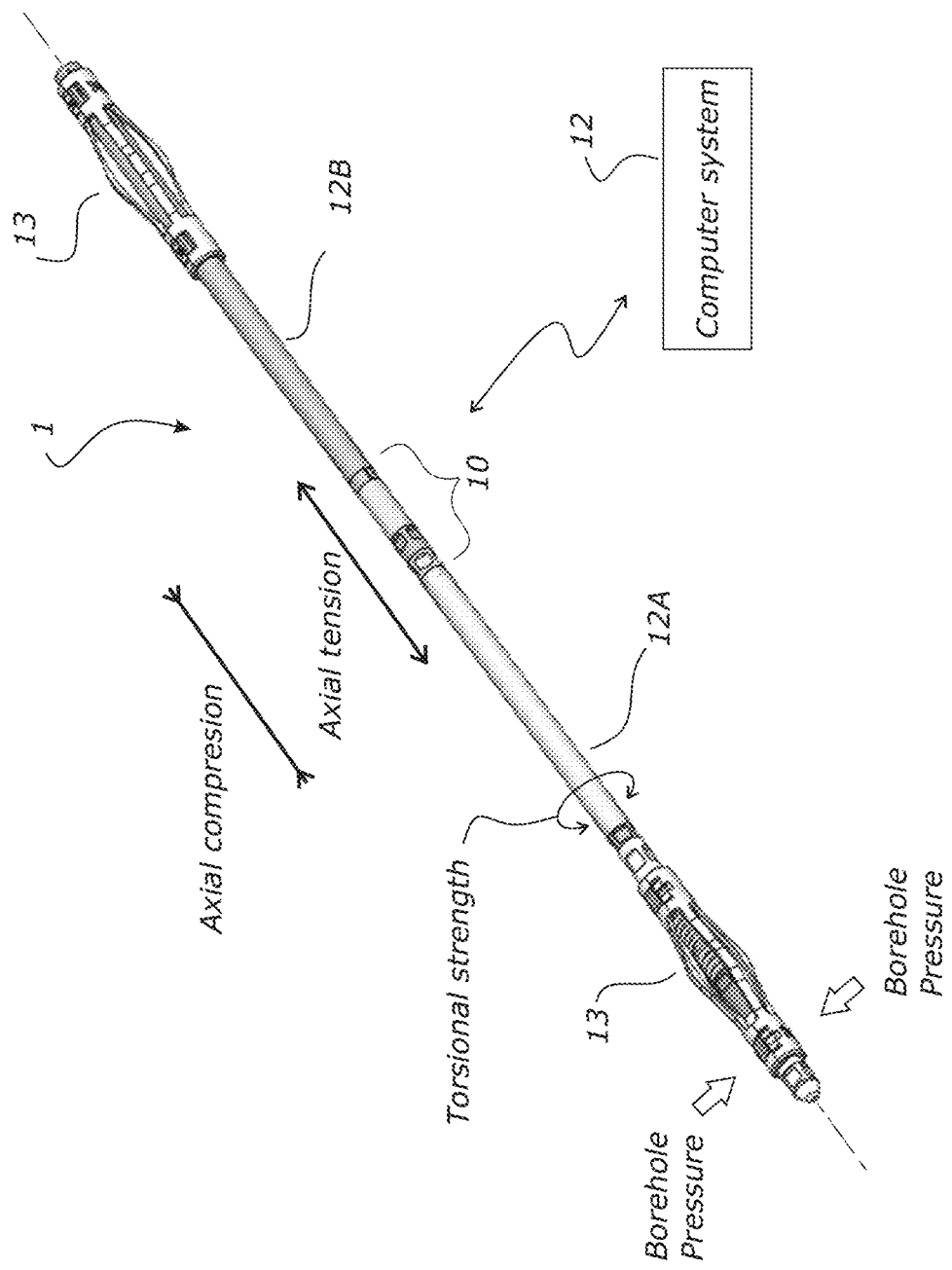
FIG. 1 shows a survey tool with a communications module.
Figure 2:
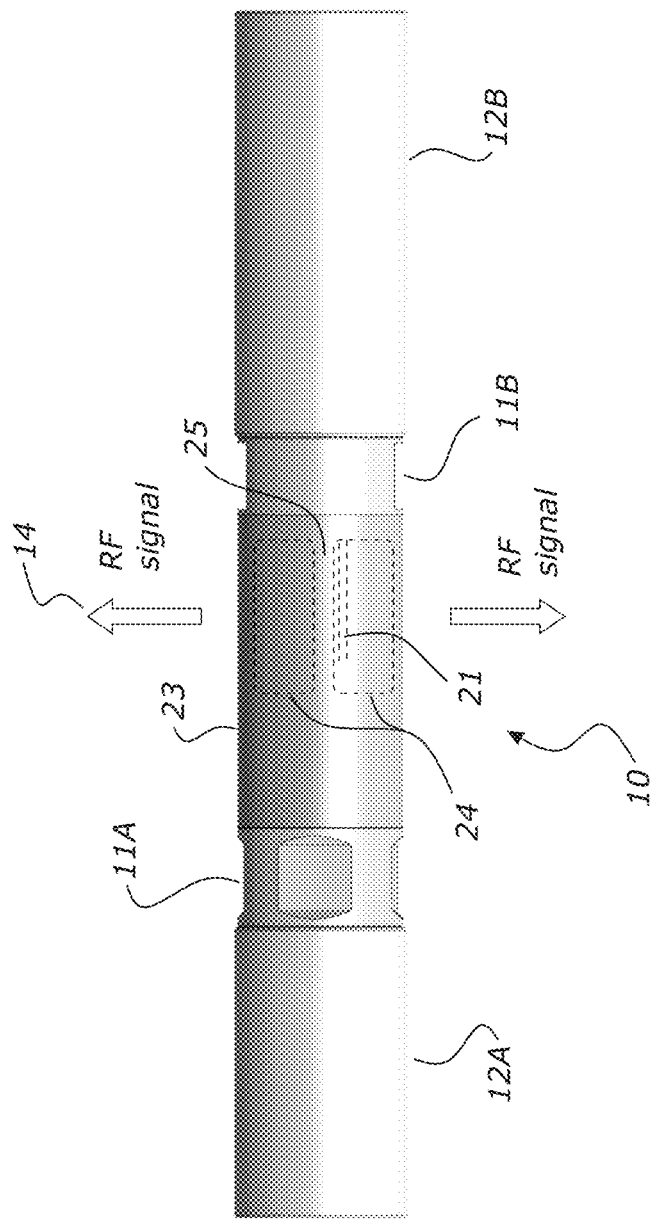
FIG. 2 shows the communications module in more detail.
Figure 2:
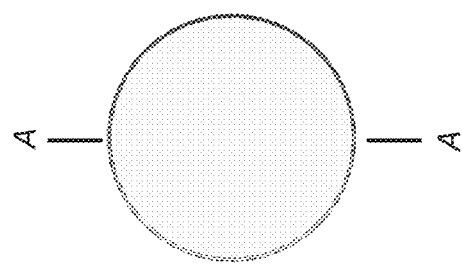

Referring to FIGS. 1 and 2, the present embodiments relate to a communications module for a survey tool assembly 1 with running gear ("survey tool assembly") and/or a survey tool assembly comprising such a communication module 10. The survey tool assembly and/or communications module could be for use in a hole, preferably in a down hole environment. The embodiments may be employed for surveying holes in a bench. In a bench, there are numerous holes that are adjacent to one another. The holes could be exploration or production holes. For example the survey tool could generally be used to determine the azimuth and dip of the hole. This uses a tool that has gyro(s) and accelerometer(s). the embodiments could also work for non-survey tools such as those that capture geological aspects of the borehole formation, such as a gamma, magnetic susceptibility, conductivity, induced polarisation tools.

The communications module 10 is located within the survey tool assembly 1. Referring to FIG. 2, the communications module 10 comprises a Radio Frequency (RF) transceiver 21 (e.g. WIFI™, BLUETOOTH™) for communicating ("RF communications" e.g. at 2.4 GHz or 4.8 GHz or 5 GHz, but this is by way of example only and non-limiting) between the survey tool assembly 1 and an external computer system 12, that can be a computer, handheld tablet or the like. The RF communications can transfer information between the external computer system 12 and the survey tool assembly 1 and/or control signals for controlling the survey tool assembly 1. On transfer of the information and/or the control signal, the external computer system can instruct the survey tool to log the hole and/or receive information from the surveyed hole.

The RF transceiver 21 is housed in an inner cylindrical cage ("inner body") 22, and an outer sleeve ("outer housing") 23 that (preferably concentrically) fits over the inner body and is sized to have the same outer diameter as the overall survey tool housing. Together the inner body and outer housing form a module housing that has two opposing ends and is sized to ensure that the overall diameter of the module housing is the same as the survey tool.

The module housing can be coupled to the survey tool assembly 1 at each opposing end via first 11A and second 11B module couplings. The communications module 10 is coupled within the survey tool assembly 1, in this case between a survey tool 12A, and a battery 12B that powers the survey tool as a non-limiting example. Items 12A and 12B could be any other typical items found in a survey tool assembly 1. The survey tool assembly may also have stabilisers/centralisers 13 and any other suitable features, to assist with tool deployment and stabilisation/centralisation within the hole.

The communications module 10 is preferably retrofittable with any suitable survey tool assembly 1. Note, that while couplings 11A, 11B and/or a retrofittable module are preferable, neither are essential. There could be other manners in which to connect the communications module 10 with a survey tool assembly 1, and it is possible the communications module 10 could even be integrated with the survey tool assembly 1. As such, while the couplings 11A, 11B can form part of the communications module 10, they should not be a limiting feature. Referring to the communications module 10 this can be deemed to cover the RF transceiver 21, cage 22 and sleeve 23 without the couplings 11A, 11B.

The RF transceiver 21 communicates (that is, provides RF communications) using RF signals 14 (also termed "electromagnetic radiation" or "electromagnetic signals") that propagate omnidirectionally to/from the communications module 10 from/to the computer system 12. The module housing 22/23 formed from the cage 22 and sleeve 23 are configured with electromagnetic properties/materials/structure to allow for omnidirectional propagation of RF signals 14 to allow for RF communications to and from the RF transceiver 21 to and from the computer and therefore the communications module 10/survey tool assembly 1. This allows for communications with less restrictions on the alignment. The module housing is further configured to structurally withstand forces experienced via the survey tool assembly 1 during use whilst in the hole. The module housing is further configured to be sealed and meet a pressure rating, such that the components in the housing are protected from pressures in a hole during use. Therefore, the housing is configured to (collectively) simultaneously meet structural requirements, electromagnetic radiation propagation requirements ("RF requirements") and pressure rating requirements.

Referring first to the RF requirements, the cage 22 preferably has a plurality of (two or more) apertures e.g., 24 (see FIG. 3) sized and positioned to moderate attenuation so that the RF signals 14 to/from the RF transceiver 21 are of sufficient strength to allow for RF communication to provide an omni-directional RF signal from the tool to the computer 12. The circumferential apertures enable omnidirectional propagation from one RF transceiver. This enables the signal to be transmitted and received from all (including radial) directions (omnidirectional) such that the user of the survey tool assembly does not need to align the tool 1 with the computer—the RF signal 14 can be received from/by the computer even with misalignment. It also allows communication with the computer within a suitable distance—such as, for example, up to about 20 m, up to about 15 m, up to about 10 m. Being omni directional enables the user to stand in an appropriate position with regards to the survey tool assembly where the RF signal can be received from/by the computer. With RF requirements met, the upload can also take place within a suitable distance—if they were not met (as is the case in traditional arrangements), then during communications with a computer, the user/survey tool would need to be closer thus making the tool less convenient to use. This is especially important in underground situations where space limitations, obstacles, and other environmental conditions affect where a surveyor holding the computer can be situated. The windows are spaced circumferentially to provide for omnidirectional RF signal propagation from the RF transceiver. Preferably the windows run along the longitudinal axis of the survey tool assembly/cage and terminate short of the full length of the cage 22. A base portion of the cage is kept with a full solid circumference for structural integrity.

The RF transceiver 21/RF signal 14 has an operating frequency/wavelength f (e.g., at 2.4 GHz or 4.8 GHz or 5 GHz, but this is by way of example only and non-limiting) and each window 24 preferably has a length L of or about ¼ wavelength of the operating frequency to minimise RF signal attenuation/maximise RF signal strength as it passes through the cage 22. The length L might not be exactly ¼ wavelength, and might deviate from that such as +/−10% tolerance—being a deviation that still provides RF properties to meet RF requirements. In fact, L could be as long as required, although other constraints discussed herein might put an upper boundary on the L. The width W of each window 24 is as large as possible to minimise RF signal attenuation/maximise RF signal strength while also meeting dimensional and structural requirements of the cage.

Details will be described later, but a general design approach is based relative to the diameter of the survey tool assembly For example, the number of windows will be selected, and then based on that spaced (preferably evenly) around the cage 22. The width of each window will be such that the window is as wide as possible while the gap between windows (support) 25 has a width strong enough to meet torsional and tensile (structural) requirements. This could be determined through experimental and/or modelling analysis (e.g., FEA). If the number of windows increases, the window width may need to decrease so there is sufficient room for the windows and/or sufficient width of the support 25 between windows to ensure structural requirements are met. The number of windows selected will also be based on providing sufficient RF propagation to meet RF requirements, while also enabling structural requirements to be met. So, the number of windows, their width and their spacing around the cage are selected so the cage meets the structural requirements and enables the RF communications that meet RF requirements. These design parameters will change with the diameter of the survey tool assembly and the antenna platform, along with the pressure rating requirements. The pressure rating relates to the hole pressure experienced by the invention whilst in the hole. The number, spacing of windows and placement may as be based on the size, shape and/or orientation of the RF transceiver so as to accommodate the same.

Note, while a plurality of apertures is preferred, it is possible that there might be only one aperture. But the more (width-wise) open space the better (for transmission), so multiple apertures might be better to attain that (width-wise) open space (that is, around the circumference of the cage).

The sleeve 23 can attenuate the RF signal 14. Therefore the sleeve is constructed from a material that is permeable to electromagnetic radiation so as to reduce RF signal 14 attenuation through the sleeve as much as possible, while still meeting other design constraints.

In addition, to meeting the structural requirements, the cage 22 has structural characteristics ("structural integrity") to withstand operational forces comprising (but not necessarily limited to):

Axial tension—due to pulling of the survey tool assembly when retracting the same from out of the hole.

Torsional stress—due to rotation of the survey tool assembly

To do this, the cage 22 is formed of an appropriate material (such as steel, stainless steel or a metal alloy). But also, the apertures 24 (which weaken the structural integrity) are formed with a width W such that the overall cage still meets the axial tension and torsional stress structural requirements. The apertures 24 are preferably arranged evenly around the cage, with a width W such that RF requirements are met, but also that the remaining cage material between each aperture (termed "column" or "support") 25 (see e.g., FIG. 3) has sufficient structural integrity to withstand the axial tension and torsional stress. For example, the width We of the column 25 is wide enough to provide structural integrity to withstand the axial and torsional forces.

Similarly, to meet structural requirements, the sleeve 23 has structural characteristics ("structural integrity") to withstand operational forces comprising (but not necessarily limited to):

Axial compression—due to the survey tool assembly being deployed into the hole.

Borehole pressure

The sleeve in combination with seals provides a pressure rated module that meets pressure rating requirements to withstand pressures during use to protect components in the housing 10. The sleeve 23 therefore forms a pressure barrel. The pressures could be e.g. up to about 8000 PSI, with step downs to about 6000 PSI for the mining field. In oil and gas, then the pressure rating may need to go up to e.g. 30,000 PSI. These are just example ratings for context, but should not be considered limiting and the pressure rating can be whatever is suitable for the field of use.

To do this, the sleeve 23 is formed of an appropriate material (such as a high pressure RF permeable material, for example, a composite material such as a fibre glass laminate, such as G10, or any other suitable non-metallic material) that means the RF requirements, but also the 23 sleeve has:
a) sufficient structural integrity to withstand the axial compression and borehole stress, and b) sufficient pressure rating to withstand pressures while in the hole.

In summary, the sleeve has characteristics that provide for pressure rating requirements, and to meet RF requirements. The cage also has characteristics to meet both the RF and structural requirements. Therefore, the combination of both the sleeve and cage provides a module that meets RF requirements, structural requirements and pressure rating requirements. Furthermore, as will become evident, the arrangement also enables a more compact (longitudinally shorter) module, which is beneficial—thus optionally satisfying a size requirement also. The shorter the overall survey tool assembly 1 the better, as it provides for a more manoeuvrable survey tool. The embodiments provide a solution that meets these requirements. This results in a RF module and survey tool assembly which provides for a more efficient work flow, as described later.

Through design criteria trade-offs, the cage 22 and sleeve 23 can be designed to meet RF, structural and pressure rating requirements to provide for omnidirectional RF signal propagation from the RF transceiver. It might optionally meet the size requirement too.

The design criteria takes into account the following, not necessarily in this order or priority, but rather in an iterative manner. No particular requirement might take precedence, although the overall goal of a device that provides information upload in a convenient manner is aimed for.

1. It is desirable to upload information using RF communications, at up to (e.g., about 10 m or about 20 m) from a receiver computer. This could be achieved with big and/or multiple RF transceivers/antennae, but that would lead to a longer communications module—e.g. 20 cm or more, where it is preferable to have a module shorter than that, e.g. about 20 cm or less, or more preferably about 10 cm or less. Therefore, one RF transceiver is preferred to make it shorter.

2. It is also desirable to have a communications module that has a pressure rating to withstand downhole pressure. So a pressure sealed housing is provided. However as there is only one RF transceiver, this may not provide sufficient signal strength to transmit up to for e.g., about 10 m through a typical metal pressure barrel (which could attenuate the signal). So a non-metallic/RF transparent material is used for the pressure barrel (that is, the sleeve). Seals are provided also.

3. But, such a pressure barrel might not meet the structural requirements of the communications module, because the material from which the communications module is constructed from is not strong enough. So an inner substructure with metallic or other suitable strong material is designed to meet the structural requirements. However, such a metallic inner substructure might attenuate RF signal thus this metallic inner substructure cannot provide the necessary RF transparency (meaning allowing sufficient RF transmission). Therefore, apertures of at least about ¼ wavelength in length or longer are provided to provide RF transparency. This results in the cage 22, which is the inner substructure. The aperture 24 could be longer to provide better RF transparency, although increasing the length might make an undesirably long communications module. The width of the apertures are made as wide as possible to improve RF transparency, while still leaving sufficient material to meet structural requirements. If the cage 22 had no windows, the structural integrity would meet structure requirements, but the attenuation of the RF signal by the cage would be too high such that the omnidirectional RF signal transmission would not be effective. Additionally, as there is one RF transceiver and not multiple, it is harder to obtain omni-direction RF propagation—however the circumferential apertures assist with omni-directional RF propagation from one RF transceiver/antenna. (note, it's not essential to have only one RF transceiver, but this makes other design requirements easier).

4. So a trade-off is made between RF transparency and ultimate transmission distance v ensuring structural requirements are met (and possible length requirements too). Modelling, RF mathematics, and other analysis can be used to balance these competing requirements. Furthermore, the cage 22 and sleeve 23 can also be designed separately, or alternatively in combination to work together to meet the RF and structural requirements. But together, they provide pressure rating, RF transparency and the required strength.

5. The cage is smaller in diameter than the internal diameter of the sleeve, so the sleeve can fit over the cage and preferably sit flush with the rest of the survey tool assembly 1 when in place.

2 First Exemplary Embodiment

A first exemplary embodiment will now be described with reference to FIGS. 1 to 4. This should not be considered limiting, but demonstrates one possible outcome that meets design requirements to provide a communications module that meets RF and structural requirements.

Referring to FIG. 1, a survey tool assembly 1 with a communications module 10 is shown. The survey tool assembly can be any survey tool assembly with running gear used in the art, and may for e.g., comprise a single survey tool 12A, such as a downhole navigational tool, and its battery 12B. Other assembly components are possible and are deemed to be covered herein. For example, this embodiment uses a tool that has gyro(s) and accelerometer(s). Other embodiments could also work for non-survey tools such as those that capture geological aspects of the borehole formation, such as a gamma, magnetic susceptibility, conductivity, induced polarisation tools. The survey tool might be, for example, about 1.5 m long, although this is exemplary only and not limiting.

The communications module 10 is coupled within the survey tool assembly 1, in this case between the survey tool 12A and battery pack 12B. The survey tool assembly may also have stabilisers 13 to centralise and locate the survey tool assembly within the hole and any other suitable features to assist with this may also be incorporated.

Figure 3:
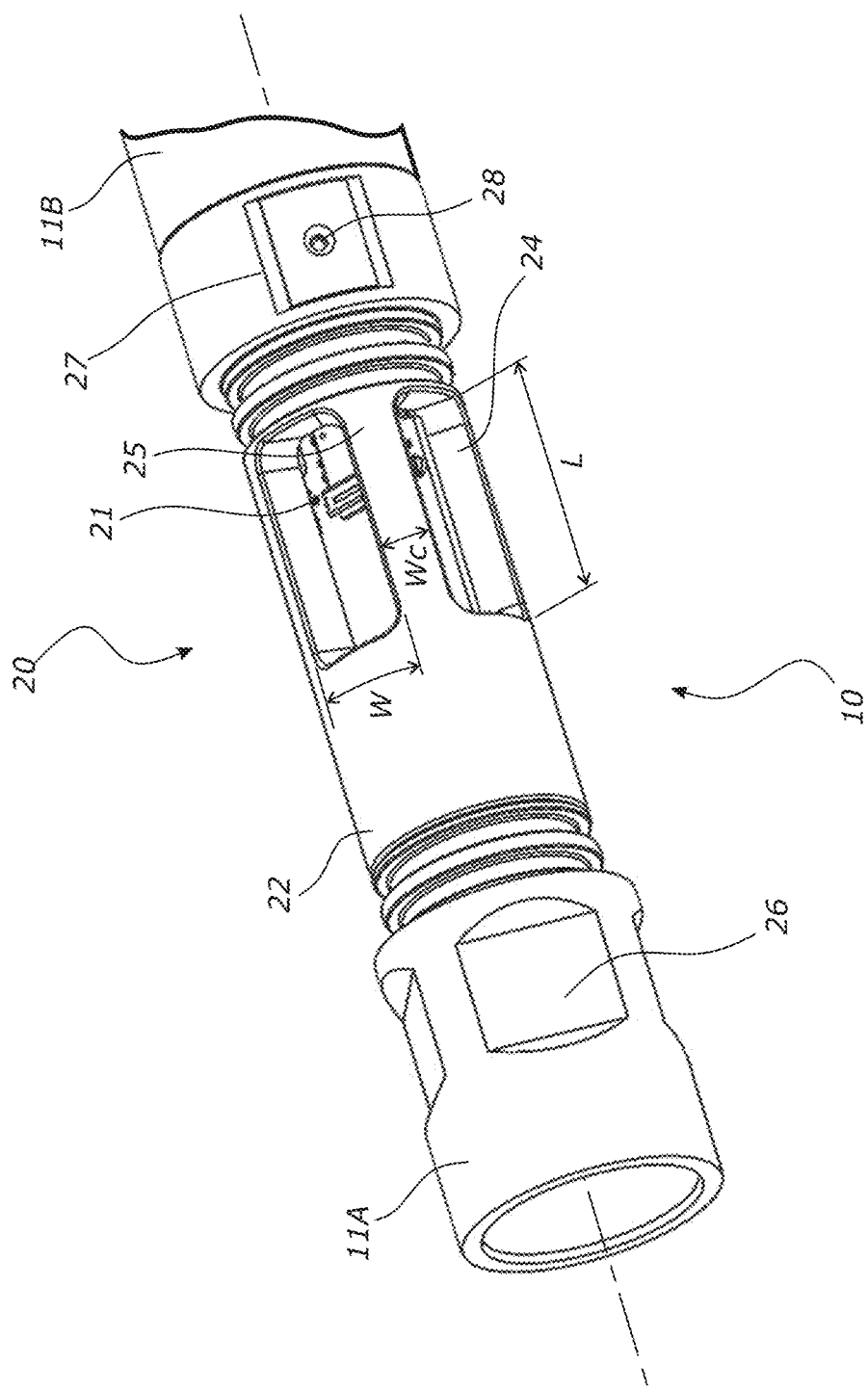
FIG. 3 shows a communications module of a first exemplary embodiment with the sleeve removed.

FIG. 3 shows the communications module 10 in isolation, with the sleeve 23 removed so the internals can be seen. It might be about 10 cm long, although this is exemplary only and not limiting. The communications module 10 comprises a main body 20, with the RF transceiver 21, cage 22 and sleeve 23 (transparent in FIG. 3 so see e.g. FIG. 2 for the sleeve 23). The communications module 10 comprises first 11A and second 11B couplings compatible for coupling the main body to a survey tool 12A, and battery 12B. These couplings 11A, 11B are formed at the ends of the cage 22. The couplings each might have tool engagement/coupling portions (e.g., spanner/wrench flats) 26 to enable the screwing or other manipulation of the couplings 11A, 11B in order to attach and detach the couplings 11A, 11B themselves and therefore the main body 20 to/from the survey tool 12A and battery 12B. Each coupling 11A, 11B might also have a removable tamper proof cap 27 (one shown over the second coupling 11B) to cover the tool engagement portions 26 to prevent unauthorised/inadvertent manipulation of the couplings 11A, 11B. The tamper proof cap 27 can have a key/lock 28 to secure the cap 27 to the coupling 11A, 11B to cover off the tool engagement portions. Only an authorised person with a key 28 can remove the protector ring 27 and gain access to the tool engagement portions 26 in order to remove the couplings 11A, 11B. Alternatively or additionally, warning wording is provided on the coupling to deter unauthorised removal.

For this embodiment, the signal strength test at a distance of 1 meter and the BLUETOOTH™ signal was at 65 dB. The range test of the antenna was able to successfully download surveys at a distance of up to about 18 metres with direct line of sight. The distance could instead be approx: up to about 30 metres, or up to about 20 metres or up to about 10 metres or up to about 5 metres or up to about 1 metre or other depending on design.

The various components of the communications module will now be described in more detail with reference to the cross section in FIGS. 3, and 4.

2.1 RF Transceiver

The RF transceiver 21 is preferably a BLUETOOTH™ transceiver operating at 2.4 GHz ("operating frequency"). The RF transceiver has circuitry and an antenna (e.g., monopole antenna) mounted on a printed circuit board ("PCB") 40. The PCB has a significantly sized ground plane. The RF transceiver antenna sits on a chassis 42. The RF transceiver antenna and orientation enables omnidirectional propagation of RF signals 14 through the cage and sleeve.

The RF transceiver 21 also has one or more lights 29 to indicate operations to a user. The light can be arranged on the PCB 40 and the module arranged in the cage 22 such that the light passes through a cage 22 aperture 24, and the sleeve 23 can be of a sufficiently transparent material to allow transmission of light so a user can see the lights.

The arrangement forms a module. The module is located in an internal region 41 of the cage 22.

2.2 Cage

Figure 4:
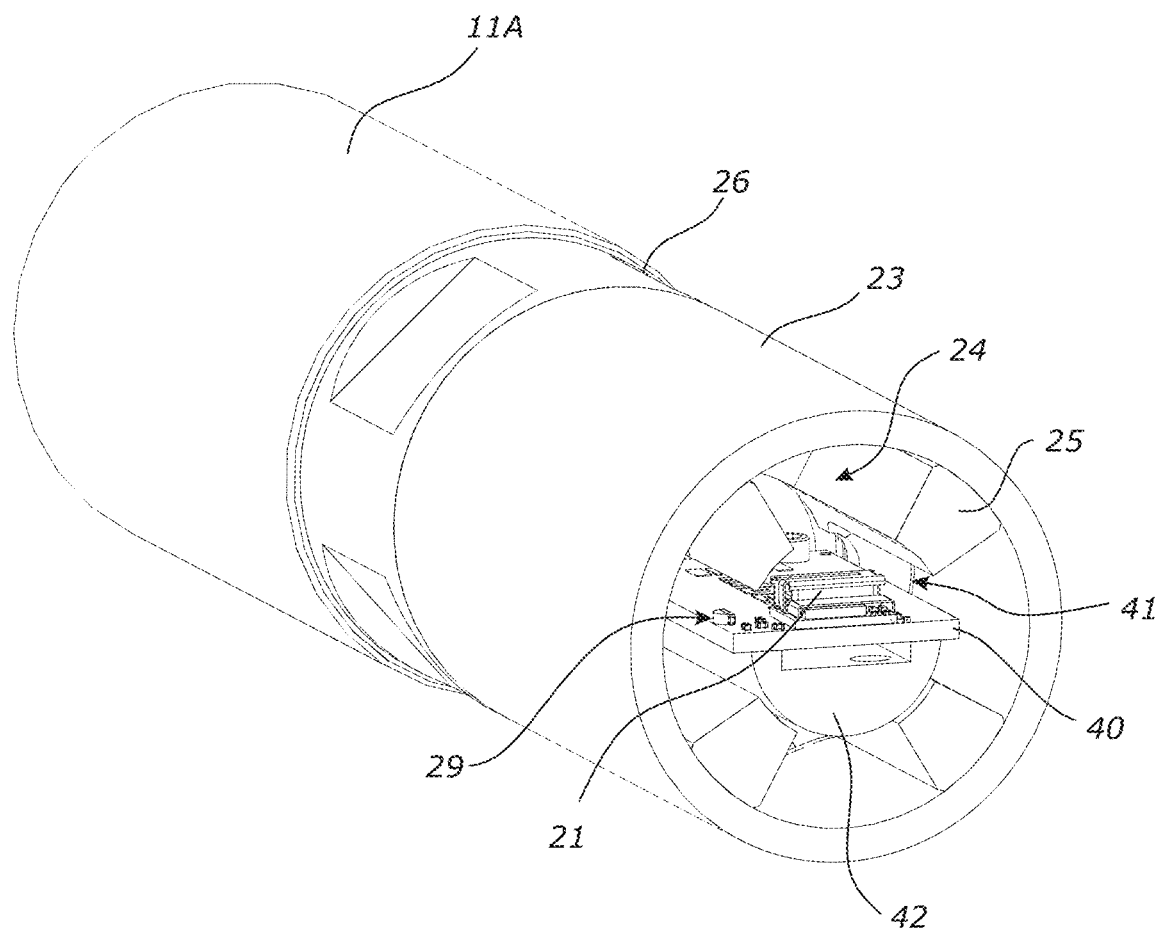
FIG. 4 shows a radial cross-section of the communications module showing the RF transceiver and columns.

Referring to FIGS. 3 and 4, the cage 22 is of a generally cylindrical form and has an internal region 41 with a recess for positioning of the RF transceiver so propagation of omnidirectional RF signals 14 (see FIG. 2, which comprise signals that propagate radially as well as other directions) is optimised (that is RF signal attenuation is minimised as much as possible). In this embodiment there are four windows/apertures 24, and four supports 25 equally spaced circumferentially to provide windows for transmission of the RF signal propagation in an omnidirectional direction from the RF transceiver. The apertures/windows 24 will have a length L of at or about a quarter (¼) wavelength at 2.4 GHz (operating frequency). The window width W will be as large as possible (to maximise open space for RF transmission) while retaining enough material in the supports 25 so they have a width Wc that meets torsional and tensile requirements.

In this embodiment, the windows 24 are spaced around the cage 22/antenna 21. The columns 25 accounts for 30 degrees of radial interference spaced equally for "universal" transmission direction. Less support 25 width Wc would increase transmission space but reduce structural integrity. Increased support width Wc decreases the windows transmission space width W while increasing structural integrity however reduces transmission direction.

The first and second ends of the cage have O-ring sealing recesses to receive double O-rings. These provide sealing regions between the cage 22 and the sleeve 23 when installed which provides sealing for the pressure sleeve.

The communications module 10 comprises first 11A and second 11B couplings compatible for coupling the main body to the survey tool 12A, and its battery 12B. For example, they can have internal threads for coupling to survey tool 12A, and its battery 12B. The couplings 11A, 11B each might have tool engagement portions (e.g., spanner/wrench flats) 26 and/or tamper proof caps 27 as previously described with reference to FIG. 2.

The couplings 11A, 11B are preferably smaller in diameter than the housing of the survey tool assembly.

This embodiment of the communications module is built for a 38 mm diameter survey tool assembly. The Wc is 30 degrees—so as a ratio that is 1/3:2/3 where there are 4 windows. So for 38 mm diameter, the cage circumference is PI×38=approx. 120 mm. Each support 25 at 30 degrees is 360/30=1/12 of the circumference=120/12=approx. 10 mm for each support 25. The remaining is windows=120−(4×10 mm)=80/4=approx. 20 mm width for each window. (All calculations approximate).

2.3 Sleeve

The sleeve 23 is cylindrical and is fitted over the cage 22 and held longitudinally between the couplings 11A, 11B. The sleeve is formed of a G10 fibreglass or similar material, which allows for RF signal 14 propagation and visible light to pass through. This is important enabling the computer system to receive the RF signal.

The cage is smaller in diameter than the internal diameter of the sleeve, so the sleeve can fit over the cage and preferably sit flush with the rest of the survey tool assembly 1 when in place.

The O rings seal the RF antennae within the cage and the sleeve completes the pressure rating where the sleeve has sufficient transparency to allow the RF signal and light on the antennae to be received outside of the sleeve. So this communication module is pressure rated and still able to communicate.

3 Second and Third Exemplary Embodiment

Figure 5:
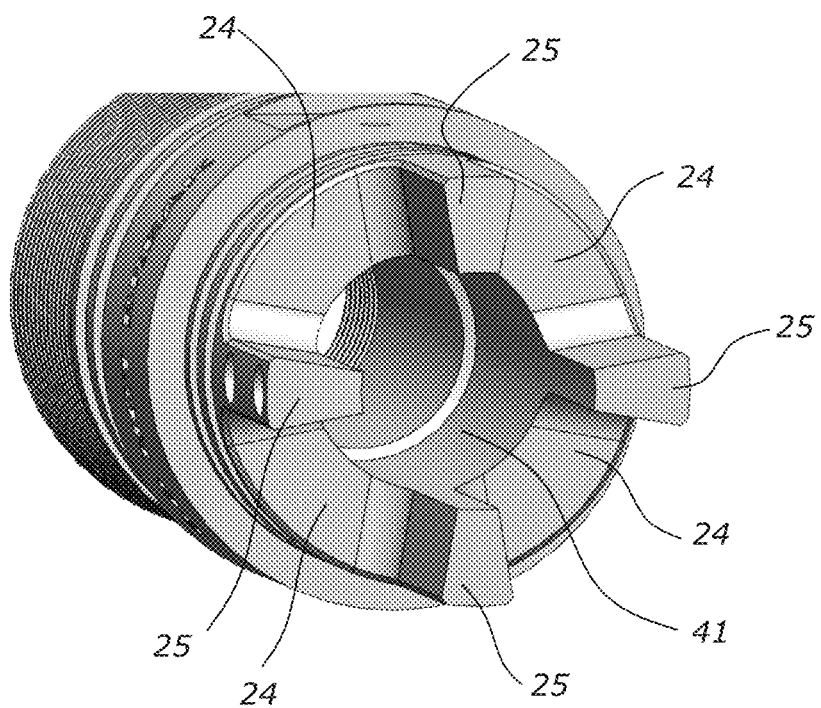
FIGS. 5 and 6 show the cages of alternative exemplary embodiments.
Figure 6:
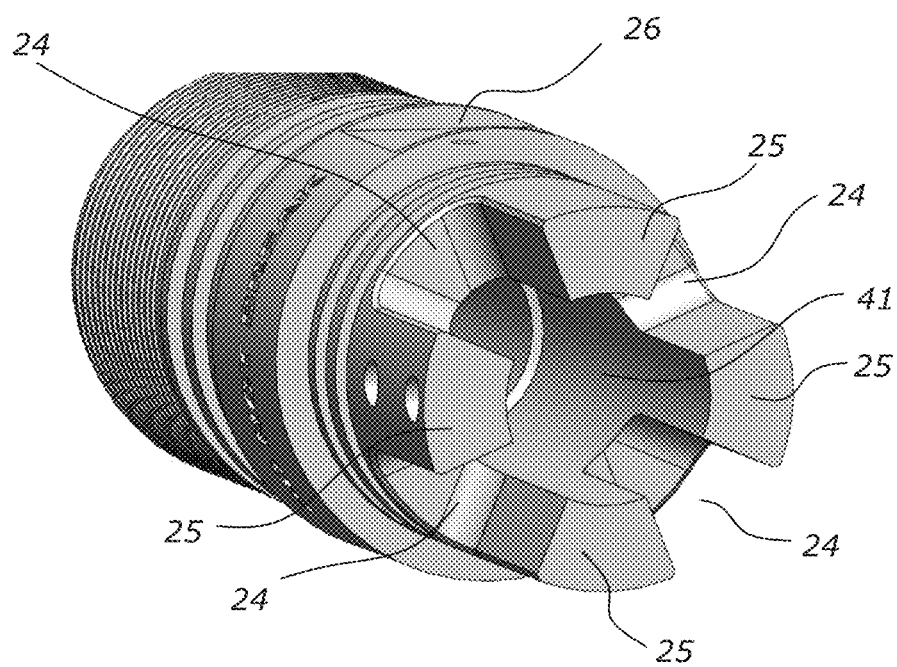

FIGS. 5 and 6 show the respective cages of second and third exemplary embodiments. The rest of the communications module features are the same as for the first exemplary embodiment.

These figures show variations in the size of the windows 24 and the supports 25. There are many variations which are possible for the cage and sleeve which enable the communications module to be retrofittable and also meet RF and structural requirements.

The window and/or support widths of the cage can change while still meeting overall requirements. There could be a trade-off between meeting RF requirements, structural requirements and pressure rating of the module, depending on prioritisation of those constraints. There can be a maximum and minimum window width/support width.

There could be a different number of windows, such as 2, 3, 5, 6, 7 or more. Where there are more windows and/or more total width windows, some structural integrity is lost, but RF signal attenuation reduces. The opposite also holds—if the number of windows/total window width reduces, then structural integrity increases, but RF signal attenuation increases also.

4. Use of Survey Tool Assembly with Communications Module and Advantages

The survey tool assembly 1 with communications module 10 is used when surveying holes to determine borehole orientation such as the azimuth and dip of the same.

The user assembles the survey tool 1 including retrofitting the communications module 10 (which is already assembly and sealed with a pressure rating), by screwing the module 10 into place in the survey tool 1. When the surveyor has assembled the survey tool 1 and placed it in a cradle or has it in a position ready to deploy into the hole, then the surveyor will use a device such as a computer or handheld tablet to initialise the survey tool 1—so the survey tool turns itself on and gets itself ready to log the hole. The surveyor can get into position to do this relatively easily without being concerned with having to be perfectly aligned with the communications module. As the RF signal from the communications module is omni-directional and the RF signal meets RF requirements to provide a range of for e.g., up to about 10 m, the surveyor can position themselves around the hole and within range of the tool at a convenient location to carry out initialisation of the tool. For example, this may be in a safe position, or in a place where the drill site requires the surveyor to be. The surveyor location is not dictated by where the module is or the RF signal (unlike the prior art tools).

Once the tool indicates it is ready—either through the flashing light changing colour, or the frequency of blinking changes, or communicating to the computer/hand held tablet, then the surveyor knows the tool is ready for deployment.

The assembly is then located in the hole and the survey takes place. The user can see that the communications module 10 is working by viewing the operation light (e.g. it might be flashing)—this confirms that communications is operational.

Once the end of the hole is reached, then the surveyor will bring the survey tool assembly 1 back up the hole. Once at the top the surveyor can determine that the tool is still working as the surveyor can see that the light is still blinking. The surveyor has the option of then placing the survey tool on a table or similar and within the transmission distance, e.g. 20 m or 10 m, of the computer or re-deploying the tool into another hole. In either situation, communications with the survey tool assembly 1 is re-established on reaching the surface due to the omnidirectional RF signal that has met the RF requirements. There is no need to remove the module or the RF transceiver from the pressure barrel.

Data is uploaded from the survey tool 1 to the computer 12. Again, the surveyor can get into position to do this relatively easily without being concerned with having to be perfectly aligned with the communications module. As the RF signal from the communications module is omni-directional and the RF signal meets RF requirements, the surveyor can position themselves around the hole and within range of the tool at a convenient location.

When the is data uploaded the survey tool can be redeployed and this process can then be repeated for other holes.

One notable advantage of the present embodiments over the traditional tools is that in work flows with traditional tools these traditional tools are much more cumbersome. This is because a communications module needs to be turned on to carry out the same initialisation process (must be still during this time), and once it is turned on it is then placed into a pressure barrel housing, the surveyor then needs to tighten the entire assembly up and place it in a position where the tool is still. Once the tool has completed its initialisation, then the tool can be deployed. This takes time, requires skill and introduces additional errors if the process is not carried out correctly. Additionally, it is difficult to know if the communications module/tool is working.

Being able to communicate with the tool and see that it is working is important. This is much harder in traditional tools. For example, as outlined above with traditional tools once the tool is in the pressure barrel and has been deployed to carry out the survey. On retrieval back up hole, then the tool needs to be removed from the pressure barrel before it can be established that the tool is still working, that communications can be re-established, and data downloaded. This is because the pressure barrel is not RF transparent—so the pressure barrel needs to be removed. This is all much more cumbersome. In the present embodiments, the sleeve/pressure barrel can remain in place. In the present embodiments, after the survey, the communications module due to omnidirectional RF communications can upload data to the computer system while the module is in place and the surveyor is in a convenient location. The module does not have to be perfectly aligned with the computer system, due to the omnidirectional propagation of RF signals. Furthermore, because good RF transmission characteristics are present, the tool can be relatively far away from the computer/tablet that is held by the surveyor. This leads to improved work flow characteristics including efficiency and safety.

Additionally with the traditional approach, once the data is downloaded or another survey needs to be carried out, then it is necessary to re-assemble the pressure sleeve and re-pressurise. This adds time to the work flow, is cumbersome and introduces errors that if the necessary skill requirements are not met can results in the tool not working properly, therefore the survey of the hole will need to be repeated.

Additional advantages of the present embodiments is serviceability. Here the inspection of the module can be carried out easily, such as the RF transceiver can be removed from the cage when required.

Thus the present embodiments lead to an improved workflow for surveying a hole. The embodiments described create a communication module that provides an omni directional communication that has its own pressure rated sleeve that forms part of the overall survey tool 1. To achieve this, the cage has windows that allow for the RF signal to propagate in an omnidirectional manner, the O rings seal the RF antennae within the cage and the sleeve completes the pressure rating where the sleeve has sufficient transparency to allow the RF signal and light on the antennae to be received outside of the sleeve. So this communication module is pressure rated and still able to communicate. The prior art although pressure rated cannot communicate until it is removed from the pressure rated housing.

The invention claimed is:

1. A communication module for a survey tool assembly comprising:
   a metallic inner body,
   an RF transparent outer sleeve configured to concentrically fit over the inner body,
   an RF transceiver in the inner body,
   at least one coupling for coupling the communication module to the survey tool assembly,
   wherein the inner body comprises two or more apertures circumferentially arranged about the inner body, each aperture having:
   a) a length that allows propagation of RF signals to/from the RF transceiver, and
   b) a width such that the body has structural integrity to withstand:
   torsional forces due to rotation of the survey tool assembly and/or
   axial forces due to forces along the survey tool assembly.

2. The communication module according to claim 1 wherein structure width between the apertures provides the structural integrity.

3. The communication module according to claim 1 wherein the inner body comprises steel, stainless steel or metal alloy.

4. The communication module according to claim 1 wherein the length of each of the two or more apertures allows propagation of RF signals so that RF requirements are met.

5. The communication module according to claim 4 wherein the RF requirements comprise that the RF transceiver can transmit/receive at a distance of up to about 30 metres, or up to about 20 metres or up to about 18 metres, or up to about 10 metres or up to about 5 metres or up to about 1 metre.

6. The communication module according to claim 1 wherein the length that allows propagation of RF signals to/from the RF transceiver is based on the transceiving frequency.

7. The communication module according to claim 6 wherein the length of each of the two or more apertures is substantially ¼ wavelength or greater of the transceiving frequency.

8. The communication module according to claim 1 wherein the width of each of the two or more apertures is about 30 mm or 20 mm, or about 15 mm or about 10 mm.

9. The communication module according to claim 1 wherein there are 2, 3, 4, 5 or 6 apertures.

10. The communication module according to claim 1 wherein the RF transceiver transceivers at 2.4 GHz or 4.8 GHz or 5 GHz.

11. The communication module according to claim 1 wherein the outer sleeve comprises an RF permeable material.

12. The communication module according to claim 1 wherein the outer sleeve has structural integrity to withstand:

a) axial forces due to forces along the survey tool assembly, and/or
b) pressure forces from a borehole.

13. The communication module according to claim 1 wherein the outer sleeve provides a pressure rated communication module.

14. The communication module according to claim 1 further comprising one or more tool coupling features.

15. The communication module according to claim 1 wherein the at least one coupling comprises couplings at opposing ends of the communication module.

16. The communication module according to claim 1 comprising one or more pressure seals between the inner body and outer sleeve.

17. The communication module according to claim 1 wherein the RF transceiver can transceive omnidirectionally.

18. The communication module according to claim 1 wherein the communication module has a length of up to about 20 cm.

19. The communication module according to claim 1 wherein the inner body has an internal recess to receive edges of a PCB.

20. The communication module according to claim 1 wherein the RF transceiver has an operating light that can be seen through both of:
at least one of the two or more apertures, and
the outer sleeve.

21. A communication module for a survey tool assembly comprising:
a metallic inner body,
an RF transparent outer sleeve configured to concentrically fit over the inner body,
an RF transceiver in the inner body,
at least one coupling for coupling the communication module to the survey tool assembly,
wherein the inner body comprises two or more apertures circumferentially arranged about the inner body, each aperture having:
a) a length that allows RF communications to meet RF requirements, and/or
b) a width such that the body has structural integrity to meet structural requirements; and/or
c) a width and/or spacing that allows RF communications to meet RF requirements, and/or
d) a length to meet size requirements.

22. The communication module according to claim 21 wherein the outer sleeve:
a) provides a pressure rated communication module, and/or
b) is made from an RF permeable material to meet RF requirements, and/or
c) meets structural requirements.

23. A survey tool assembly comprising a communication module according to claim 21.

* * * * *